(12) United States Patent
Wetzel et al.

(10) Patent No.: US 6,604,035 B1
(45) Date of Patent: Aug. 5, 2003

(54) DEVICE AND METHOD FOR STABILIZING A VEHICLE

(75) Inventors: Gabriel Wetzel, Stuttgart (DE); Ian Faye, Stuttgart (DE); Klaus-Dieter Leimbach, Moeglingen (DE); Falk Hecker, Markgroeningen (DE); Oliver Jundt, Besigheim (DE); Herbert Schramm, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,189

(22) PCT Filed: Dec. 28, 1999

(86) PCT No.: PCT/DE99/04119

§ 371 (c)(1),
(2), (4) Date: Nov. 20, 2000

(87) PCT Pub. No.: WO00/38965

PCT Pub. Date: Jul. 6, 2000

(30) Foreign Application Priority Data

Dec. 29, 1998 (DE) .......................................... 198 59 966

(51) Int. Cl.$^7$ ...................... B60G 23/00; B60G 21/045; B62K 25/00; B60T 7/12; G05D 1/00

(52) U.S. Cl. ............................ 701/38; 701/37; 701/39; 701/48; 701/72; 701/91; 303/146; 280/5.502; 280/5.504; 280/5.506; 280/5.507

(58) Field of Search ............................. 701/37, 38, 39, 701/48, 72, 90, 91, 80, 95; 303/123, 146, 7; 280/5.502, 5.504, 5.505, 5.506, 5.507, 5.508

(56) References Cited

U.S. PATENT DOCUMENTS

| | | | |
|---|---|---|---|
| 5,415,466 A | | 5/1995 | Breen et al. .................... 303/7 |
| 5,640,324 A | * | 6/1997 | Inagaki ......................... 701/70 |
| 5,747,683 A | * | 5/1998 | Gerum et al. ............... 73/118.1 |
| 5,895,433 A | * | 4/1999 | Chen et al. ..................... 701/41 |
| 5,915,800 A | * | 6/1999 | Hiwatashi et al. ........... 303/146 |
| 5,931,887 A | * | 8/1999 | Hac .............................. 701/71 |
| 6,035,251 A | * | 3/2000 | Hac et al. ...................... 701/70 |
| 6,161,905 A | * | 12/2000 | Hac et al. .................... 303/146 |
| 6,223,114 B1 | * | 4/2001 | Boros et al. .................... 701/70 |

FOREIGN PATENT DOCUMENTS

| | | |
|---|---|---|
| DE | 197 24 092 | 12/1998 |
| EP | 0 385 648 | 9/1990 |
| EP | 0 943 514 | 9/1999 |

OTHER PUBLICATIONS

Hecker et al., F., SAE Paper No. 973284, "Vehicle Dynamics Control for Commercial Vehicle", Nov. 17–19, 1997.*
Hecker et al., F., SAE Paper No. 97 3284, "Vehicle Dynamics Control for Commercial Vehicle," Nov. 17–19, 1997.
Van Zanten et al, Von Anton. "FDR—Die Fahrdeyamikregelung von Bosch," Automobiltechnische Zeitschrift (ATZ), 96, vol. 11, pp. 674–689, 1994.

* cited by examiner

Primary Examiner—Jacques H. Louis-Jacques
Assistant Examiner—Brian J. Broadhead
(74) Attorney, Agent, or Firm—Kenyon & Kenyon (57) ABSTRACT

A device for stabilizing a vehicle is described. For this purpose, the device includes first determination device with which at least two vehicle motion quantities describing the vehicle motion, in particular in the direction transverse to the vehicle, are determined. Furthermore, the device includes second determination device with which a characteristic quantity is determined for each of the vehicle motion quantities. The second determination includes an adjustment device with the help of which the variation over time of the characteristic quantities is adjusted to the vehicle's behavior. In addition, the device device includes a control device with which intervention quantities are determined at least as a function of the vehicle motion quantities and the characteristic quantities, which are supplied to an actuator system for performing at least brake interventions and/or engine interventions with which the vehicle is stabilized.

18 Claims, 5 Drawing Sheets

DEVICE AND METHOD FOR STABILIZING A VEHICLE

FIELD OF THE INVENTION

The present invention relates to a device and a method for stabilizing a vehicle.

BACKGROUND INFORMATION

SAE Paper No. 973284 entitled "Vehicle Dynamics Control for Commercial Vehicles" describes a device for stabilizing a commercial vehicle designed as a tractor-trailer composed of a tractor vehicle and a semi-trailer. The float angle and the yaw rate of the tractor vehicle and buckle angle between the tractor vehicle and the semi-trailer are controlled. For this purpose, a system deviation between the actual values and the setpoint values for the float angle, the yaw rate and the buckle angle are determined. Engine interventions and/or brake interventions are initiated as a function of these system deviations to stabilize the tractor-trailer.

The article entitled "FDR—Die Fahrdynamikregelund von Bosch" (Vehicle Dynamics Control by Bosch), published in the journal "Automobiltechnische ZeitschriftS", (ATZ) [Journal of Automotive Technology] 96, Vol. II, pp. 674–689, 1994 describes such a stabilization device for passenger cars. In this stabilization device only the yaw rate and the float angle of the vehicle are taken into consideration for control.

Neither the conventional device for stabilizing the tractor-trailer nor the conventional device for stabilizing a passenger car provides for adjustment of the variation over time of the setpoint values for the quantities to be controlled to the behavior of the vehicle. This results in the following disadvantage: for example, if the driver of the vehicle performs a steering motion, experience shows that a certain period of time elapses before the vehicle follows this steering motion and performs the desired cornering, for example, i.e., attains the steady-state condition initialized by the steering motion. If the setpoint values are determined using appropriate vehicle models describing the steady-state condition as a function of the steering angle without time adjustment, the setpoint values of the steady-state condition are present from the very beginning. However, since the instantaneous actual state of the vehicle does not correspond to the steady-state condition, at least immediately after the steering motion has been initiated, a system deviation occurs, resulting in inappropriate and unnecessary control interventions, which would not be performed if the variation of the setpoint values over time were adjusted to the vehicle behavior.

SUMMARY

An object of the present invention is to improve existing devices and methods for stabilizing vehicles and forming the system deviation.

The device according to the present invention includes first determining means with which at least two vehicle motion quantities describing the motion of the vehicle, in particular in the direction transverse to that of travel, are determined. These vehicle motion quantities correspond to the actual values mentioned previously. In addition, the device includes second determination means with which a characteristic quantity corresponding to the above-mentioned setpoint value is determined for each of the vehicle motion quantities. The characteristic quantities describe the vehicle behavior intended by the driver. Furthermore, there are control means with which intervention quantities are determined at least as a function of the vehicle motion quantities and the characteristic quantities. These intervention quantities are sent to actuator means for performing at least brake interventions and/or engine interventions with which the vehicle is to stabilized.

In order to achieve the improvement in forming the system deviation, the second determination means have adjusting means with which the variation of the characteristic quantities over time is adjusted to the vehicle behavior. This means that in forming the characteristic quantities, it is taken into account that the vehicle does not immediately assume a steady-state condition, but only assumes it after a certain period of time.

Since the characteristic quantities also describe the steady-state condition of the vehicle after a certain period of time, the second determination means advantageously include calculation means with which final values for the characteristic values are determined. These final values correspond to the values of the vehicle motion quantities present in the steady-state condition of the vehicle. The final values are sent to the adjustment means and the characteristic quantities are determined as a function of these final values.

It has been found that the final values are advantageously determined at least as a function of a steering angle quantity describing the steering angle set for the vehicle and a velocity quantity describing the velocity of the vehicle. The velocity of the tractor vehicle is advantageously considered the vehicle velocity.

The above discussion shows that the variations over time of the characteristic quantities are adjusted to the vehicle's behavior so that the characteristic quantities advantageously attain their respective final values only after a predefined period of time that is characteristic for the vehicle.

Regarding the period of time characteristic for the vehicle, two procedures are advantageous: either the period of time is fixed or it is determined at least as a function of one of the quantities describing the vehicle's behavior.

Advantageously, there also are two procedures for adjusting the variation over time of the characteristic quantities. In the first procedure the variations over time of all characteristic quantities are adjusted to the vehicle's behavior in the same manner using the adjusting means. In this case the time periods after which the characteristic quantities attain their final values are the same for all characteristic quantities. This procedure can be used when the vehicle exhibits the same behavior over time, concerning assuming the steady-state condition, for all vehicle motion quantities for which control is performed. In the second procedure the variation over time of each individual characteristic quantity is separately adjusted to the vehicle's behavior. This procedure is required when the vehicle exhibits different conditions over time for the vehicle motion quantities for which control is performed.

The adjustment means are designed, for example as filtering means with which the variation of the characteristic quantities over time is influenced by defining a filter constant.

It is advantages if an all pass filter is used as filtering means. The phase and thus the variation of the characteristic quantities over time can be modified using an all-pass filter without modifying the value, i.e., the amplitude of the characteristic quantity. The same holds true if a low-pass filter that has a very low limit frequency is used as a filtering means.

As mentioned previously, the final values are determined at least as a function of a steering angle quantity and a velocity quantity. Vehicle models/mathematical models are used for this purpose. Some of the parameters used in these models are determined at least as a function of vehicle quantities and/or vehicle parameters.

The vehicle quantities advantageously include at least one mass quantity and/or at least one center of gravity position quantity. This ensures that, in determining the characteristic quantities, the influence of different load conditions is taken into account. This means that the different vehicle conditions are advantageously recognized and taken into account in the control. For tractor-trailers one mass quantity and one center of gravity position quantity are advantageously determined for both the tractor vehicle and the trailer or semi-trailer. Geometry parameters and/or tire side rigidity quantities are used as vehicle parameters, since most of these parameters have a non-negligible effect on the vehicle's behavior.

The control means contained in the device have different individual controllers. In the control principle implemented, one of these individual controllers influences the others and/or one of these controllers controls the others. This principle has the advantage that proven individual controllers can be used for the controlled or lower-order individual controllers.

It also is advantageous if the value of at least part of the final values is limited. These values are limited as a function of a transverse acceleration quantity describing the transverse acceleration acting on the vehicle, and/or a function of the longitudinal acceleration quantity describing the longitudinal acceleration acting on the vehicle, a function of a friction coefficient quantity describing the instantaneous friction coefficient between the road surface and the tires, or a function of wheel force quantities describing the forces acting on the wheels of the vehicle.

The device according to the present invention can be used for both single vehicles and tractor-trailers. If the vehicle in which the device according to the present invention is used is a tractor-trailer that has a tractor vehicle and the trailer or semi-trailer, three vehicle motion quantities are determined using the first determining means. Two of these vehicle motion quantities describe the condition of the trailer vehicle and one of these vehicle motion quantities describes the position the behavior of the trailer or semi-trailer with respect to the tractor vehicle. Specifically in this case a yaw rate quantity describing the yaw rate of the of the tractor vehicle is used as a first vehicle motion quantity, a float angle quantity describing the float angle of the vehicle is used as a second vehicle motion quantity, and/or a buckle angle quantity describing the buckle angle between the tractor vehicle and the trailer or semi-trailer is used as a third vehicle motion quantity.

If the vehicle in which the device according to the present invention is used is a single vehicle, a yaw rate quantity and/or a float angle quantity are determined as vehicle motion quantities.

It should be pointed out here how the float angle of the vehicle is geometrically defined as the angle between the direction of the vehicle velocity at the center of gravity of the vehicle and the longitudinal axis of the vehicle.

It also may be advantageous if the device according to the present invention includes a trailer and/or semi-trailer detector that automatically detects whether a trailer or semi-trailer is attached to the tractor vehicle.

In addition to the above-mentioned brake interventions and engine interventions, chassis interventions or transmission interventions can also be used to stabilize the vehicle.

DETAILED DESCRIPTION

Figure 1:
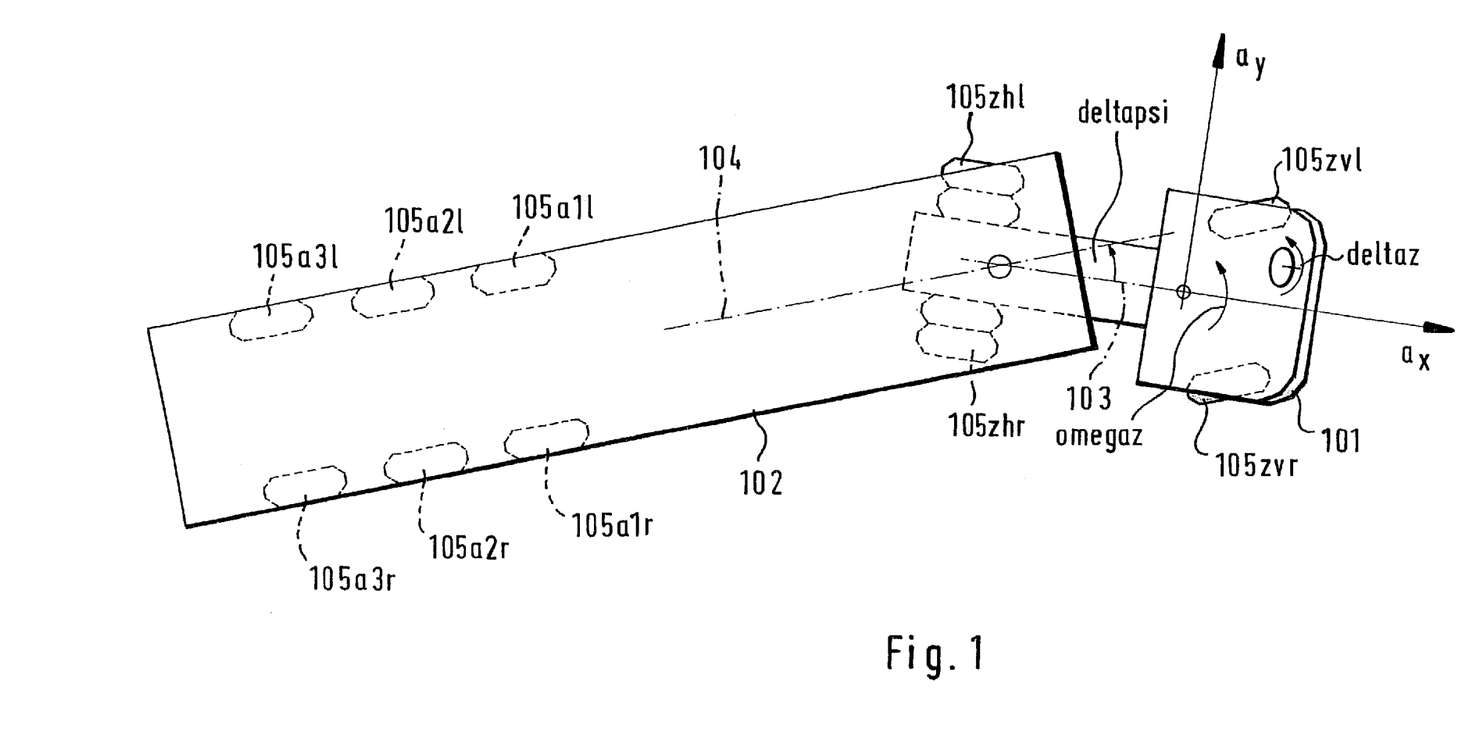
FIG. 1 shows a tractor-trailer in which the device according to the present invention is used.

FIG. 1 shows a tractor-trailer including a tractor 101 and semi-trailer 102. Tractor vehicle 101 and semi-trailer 102 are effectively connected by a rotating joint, usually a kingpin, not illustrated.

This embodiment is based on an articulated joint between tractor and semi-trailer that should not represent a limitation. The device according to the present invention can be similarly used also for a tractor-trailer including a tractor and a draw bar trailer. The device according to the present invention can also be advantageously used in a similar manner for a single vehicle.

Tractor vehicle 101 has wheels 105$zij$, whose actuators are associated with the performance of brake interventions. In the notation 105$zij$ index z indicates that the wheels belong to the tractor vehicle. Index i indicates whether reference is made to a front axle (v) or a rear axle (h). Index j indicates if reference is made to a right-side (r) or a left-side (l) vehicle wheel. Trailer 102 has wheels 105$axj$. Index a indicates that the wheeler belongs to the semi-trailer. Index indicates which axle of the semi-trailer the respective wheel belongs. The closer the vehicle axle to the rear edge of the semi-trailer, the higher the value of this index. Index j has the same meaning as it does in connection with the tractor vehicle. Indices a, i, j, x, and z have the same meaning in whichever quantities or components they are used.

It should be noted at this point that the number of wheels of the tractor vehicle or the semi-trailer shown in FIG. 1 and the number of axles shown in FIG. 1 has no limiting effect on the device according to the present invention. Some of the wheels shown as single wheels in FIG. 1 may actually be dualwheels.

FIG. 1 shows a longitudinal axis 103 of the tractor vehicle. Longitudinal axis 104 of the semi-trailer is similarly shown. As FIG. 1 shows, two longitudinal axes 103 and 104 form an angle deltapsi, which is referred to as the buckle angle. According to the amount by which the semi-trailer is deflected with respect to the tractor vehicle, buckle angle deltapsi has different values.

FIG. 1 also shows the quantities describing the travel characteristics of the tractor vehicle such as longitudinal acceleration ax, transverse acceleration ay, yaw rate omegaz and steering angle deltaz set for the tractor vehicle.

Figure 2:
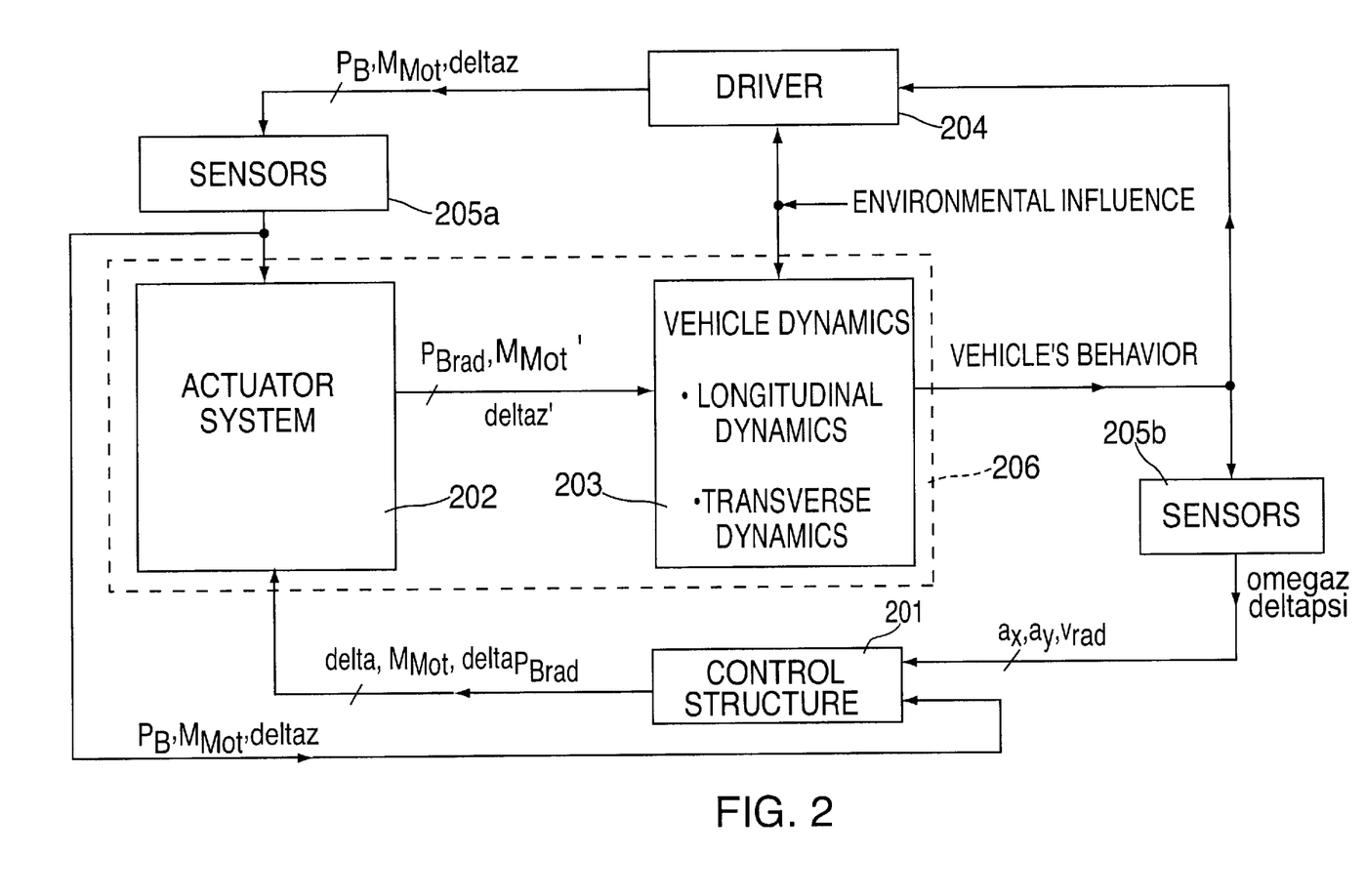
FIG. 2 shows a control model of a device according to the present invention.

FIG. 2 shows the control model on which the device according to the present invention is based. This control model contains two control loops: a higher-order loop formed from driver 204 and a lower-order loop formed from control structure 201 according to the present invention.

A vehicle 206 is shown. As FIG. 2 shows, environmental influences such as side wind, roadway characteristics or roadway shape act upon vehicle. These environmental influences also affect driver 204. The environmental influences affect the vehicle's behavior. Other influences are described below. The behavior of the vehicle, for example, the rolling motion of the vehicle under the effect of side wind, also affects the driver. At the same time the behavior of the vehicle is also detected by sensors 205b. The yaw rate omegaz of the tractor vehicle is determined in the first place by a yaw rate sensor; the transverse acceleration ay of the tractor vehicle is determined by a transverse acceleration sensor; the wheel velocities vrad of both the tractor vehicle and the semi-trailer are determined by wheel rotational speed sensors, and buckle angle deltapsi is determined using an appropriate sensor means. Longitudinal acceleration ax of the tractor vehicle can be determined either in the conventional manner from the wheel velocities or by using an appropriate acceleration sensor. The quantities measured by sensors 205b are sent to control structure 201.

On the basis of the environmental influences and the behavior of the vehicle experienced by the driver, he defines a steering angle deltaz by actuating the steering wheel, an engine torque MMot by actuating the accelerator, and an admission pressure PB by actuating the brake pedal. These quantities defined by the driver are detected by sensors 205a. The steering angle is detected using a steering angle detector, for example. The engine torque set by the driver can be derived from the accelerator position, detected using an appropriate position sensor or potentiometer, for example. The admission pressure set by the driver is detected by a pressure sensor. The quantities detected by sensors 205a are supplied both to actuator systems 202 arranged in the vehicle and to control structure 201.

Block 202 includes different actuators. On the one-hand, it includes the brakes associated with the wheels of the tractor vehicle and the wheels of the semi-trailer. On the other hand, it includes means with which the drive can be influenced, i.e., with which engine intervention can be performed, for example. Depending on the type of internal combustion engine, these are means for influencing the throttle valve angle, the firing point, or the amount of fuel injected. In addition, the actuators may also includes means for influencing steering as indicated in FIG. 2 by block 202 sending a quantity deltaz'to block 203. In addition, block 202 may also include a retarder.

Control structure 201 determines, as a function of the quantities received and the control implemented therein, quantities deltaMMot and deltaPBwheel, which are also sent to actuator system 202. Forward propulsion is influenced as a function of quantity deltaMMot and the brakes of the individual wheels are influenced as a function of quantity deltaPBwheel. The following procedure is followed here: if the driver takes some action, i.e., quantities PB, MMot, and deltaz are present, in block 202 these quantities are additively superimposed on the quantities generated by control structure 201. However, if no driver intervention is present, i.e., quantities PB, MMot, and deltaz are not present, actions are taken only as a function of quantities deltaMMot and deltaPBwheel generated by control structure 201.

The transfer of quantities PBrad, MMot', and deltaz' from block 202 to block 203 indicates that the actions taken using actuator system 202, the vehicle dynamics, or more accurately speaking the longitudinal and transverse dynamics of the vehicle, are influenced. The prime sign in symbols MMot' and deltaz' indicates that the actions executed by the actuators may be different from those defined by the driver. If the vehicle is equipped with a retarder, retarder actions can also be taken using actuator system 202 in order to influence the vehicle dynamics.

The following should be pointed out here: the designation "rad" [wheel] in PBrad and deltaPBwheel indicates that individual wheels can be influenced separately. In addition, FIG. 2 is a schematic diagram describing the control model on which the device according to the present invention is based. This means that the individual blocks shown in FIG. 2 do not have a direct technical equivalent. This is true, for example, for block 203.

Figure 3:
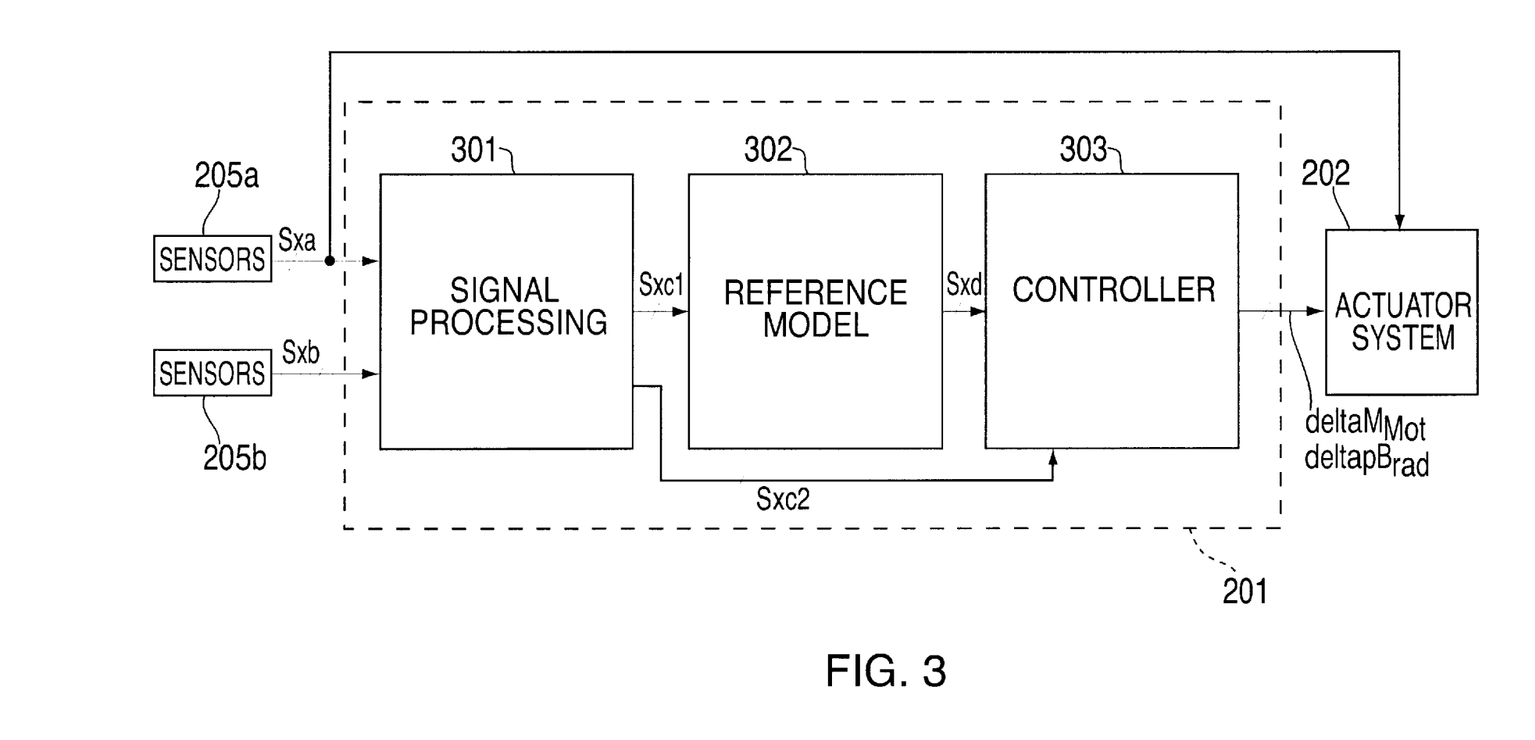
FIG. 3 shows a control structure according to the present invention.
Figure 4:
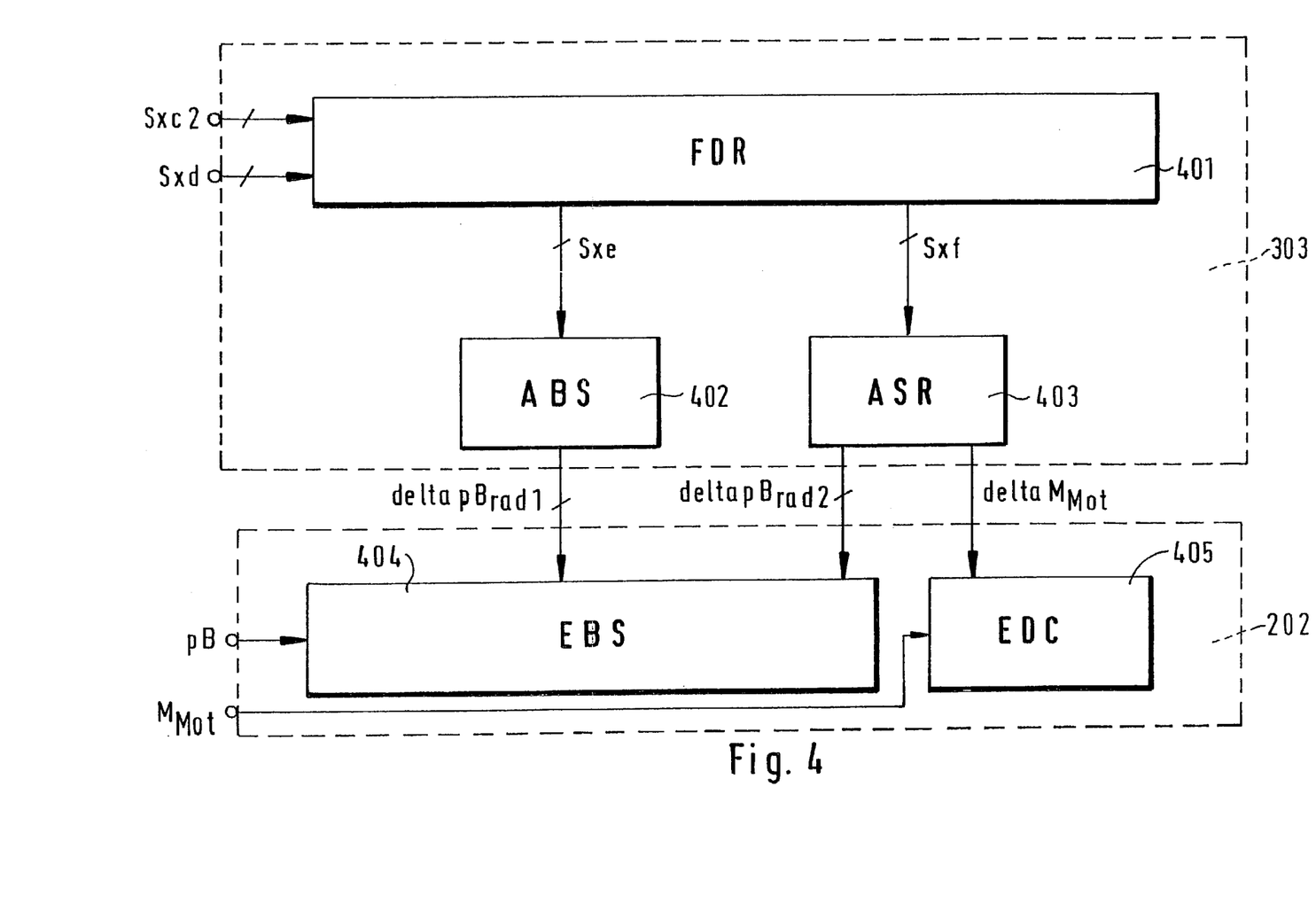
FIG. 4 shows a shows a controller and an actuator system according to the present invention.
Figure 5:
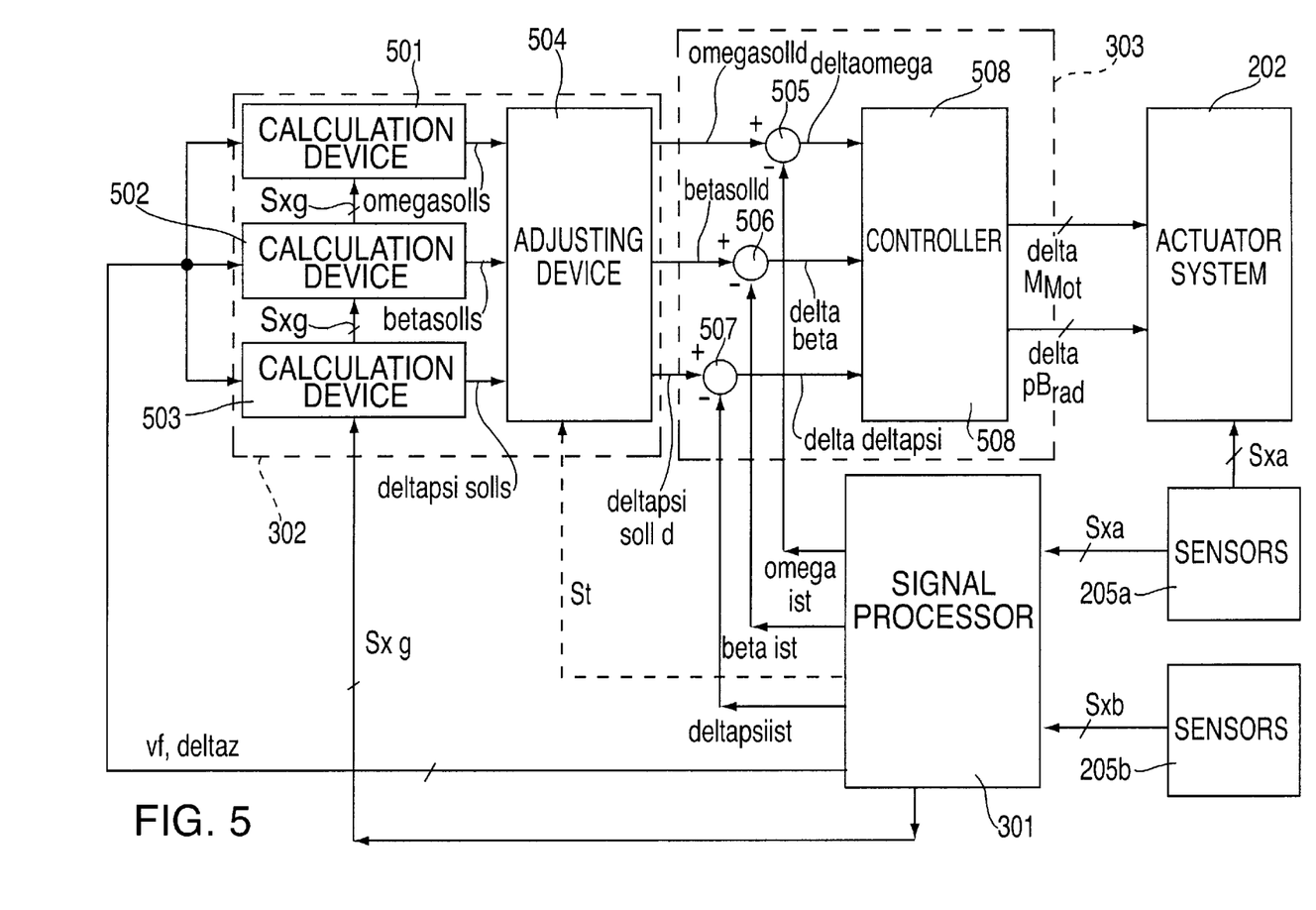
FIG. 5 shows a control structure according to the present invention.

With respect to FIG. 2 it is also conceivable that action be taken to influence the steering system from control structure 201. This, however, is not represented in FIG. 2, nor are the corresponding quantities output by the control structure indicated. In FIGS. 3 through 5 a steering system is not taken into account. This, however, should not represent a restriction. Such control structures that provide such actions can obviously be used.

FIG. 3 shows control structure 201 in more detail. The signals and quantities Sxa representing the driver's intention, generated by sensors 205a, are sent both to block 301 and to actuator system 202. Abbreviated notation Sxa stands for the signals or quantities shown in FIG. 2 in connection with sensors 205a. Signals and quantities Sxb representing the vehicle's behavior are sent to block 301. Abbreviated notation Sxb represents in this case the signals and quantities described in connection with sensors 205b.

Block 301 represents the signal processing in control structure 201, including filtering means and estimation means. At least part of the signals and quantities detected by sensors 205a and 205b are processed using filtering means. The signals and quantities are low-pass filtered to suppress interference. In addition, some of the signals and quantities are differentiated by appropriate filtering if required by the control. Quantities required for performing the control or taken into account by the control are determined using the estimation means. This includes the following quantities: mass quantities describing the mass of the traction vehicle and the semi-trailer. The following procedure is followed for determining the mass quantities. A total mass of the tractor-trailer is determined as a function of the wheel velocities and the propulsion force derived from the engine torque defined by the driver. Since the mass of a traction vehicle is known in the case of a semi-trailer, the mass of the semi-trailer can be estimated. In the case of a tractor-trailer including a tractor vehicle and a draw bar trailer, the coupling force between the tractor vehicle and the draw bar trailer and the longitudinal acceleration acting on the tractor-trailer must be taken into account in determining the individual masses. The coupling force can be determined either by using an appropriate sensor or by an appropriate estimation procedure. As an alternative or in addition to the mass quantities, the moments of inertia for the tractor vehicle and the semi-trailer can also be determined.

Center of gravity position quantities describing the position of the center of gravity of the tractor vehicle and the semi-trailer are determined. Both center-of-gravity position quantities can be determined from the wheel loads, for example, when the vehicle travels in a straight line and is neither accelerated nor braked. The wheel velocities are evaluated in order to determine the wheel loads.

Wheel force quantities describing the forces acting on the individual wheels are determined. Slip angle quantities describing the slip angle of the individual wheels are determined. The wheel force quantities and the slip angle quantities are determined at least as a function of the transverse acceleration, the yaw rate, the steering angle, and the vehicle velocity.

A velocity quantity vf describing the vehicle velocity in the longitudinal direction of the vehicle is determined. This velocity quantity vf is determined in a convention manner from the wheel velocities. Furthermore, a velocity quantity vy describing the vehicle velocity in the transverse direction of the vehicle is determined. This velocity quantity, can be determined by integrating the transverse acceleration.

A friction coefficient quantity describing the friction coefficients between the tires and the roadway is determined in appropriate driving situations. The friction coefficient quantity can be estimated as a function of the longitudinal acceleration, which is determined from the wheel velocities, and the transverse acceleration.

In addition, a float angle quantity which describes the float angle of the traction vehicle and is required for control, is determined. The float angle quantity is determined as a function of the vehicle transverse velocity, the vehicle longitudinal velocity, and the yaw rate of the vehicle.

Part of the signals and quantities generated in block 301, namely Sxc1, is sent to block 302. These individual signals and quantities are described in more detail with reference to FIG. 5. Another part of the signals and quantities generated in block 301, namely Sxc2, is sent to block 303. These quantities Sxc2 are the actual values required for the control.

Block 302 is the reference model with which characteristic quantities Sxd, i.e., the setpoint values required for the control, are determined. These characteristic quantities are sent to block 303. Block 303 represents the actual controller that performs the actual control as a function of actual values Sxc2, i.e., the vehicle motion quantities, and characteristic quantities Sxd, i.e. the setpoint values, determining at this time quantities deltaMMot and deltaPBwheel, which are sent to actuator system 202 to perform the control interventions. The controller can be implemented as a PD controller for which parts of its parameters are determined as a function of the friction coefficients or wheel force quantities, for example. In addition, controller 303 may also contain a situation recognition system with which the driving situations are monitored, for example. Appropriate measures to influence quantities deltaMMot and deltaPBwheel are taken as a function of the driving situation.

In the following we shall describe FIG. 4 which illustrates controller 303 and actuator system 202 in detail.

Controller 303 has three individual controllers 401, 402 and 403. Of these three individual controllers, individual controller 401 controls the other two, i.e., individual controller 402 and 403 are influenced by individual controller 401.

Individual controller 401, which represents the controller for performing vehicle dynamics control, i.e., control of the yaw rate the float angle of the traction vehicle, and the buckle angle, receives both quantities Sxc2, i.e., the vehicle motion quantities and quantities Sxd, i.e., the characteristic quantities for the vehicle motion quantities. Individual controller 401 performs the respective system deviations as a function of quantities Sxc2. According to the control that is implemented in it, it converts the system deviations into two quantities Sxe and Sxf, of which quantities Sxe are sent to individual controller 402. Individual controller 402 is a brake slip controller and quantities Sxe it receives are quantities describing the brake slip to be set on the wheels.

Quantities Sxf generated using individual controller 401 are quantities describing the drive slip on the driven wheels and, are sent to individual controller 403, a drive slip controller.

Additional quantities sent to individual controllers 402 and 403 are not shown in FIG. 4 for the sake of clarity; this, however, should not represent any limitation. The quantities not illustrated may include the wheel velocities of the individual wheels, for example.

Quantities Sxe sent to individual controller 402 are converted there into quantities deltaPBrad1, which are forwarded to block 404, an electropneumatic brake contained in the actuator system. The electropneumatic brake is a brake in which the valves associated with the individual wheels are actuated via electrical signals to influence the compressed air in the wheel brake cylinders, which represents the braking medium.

Quantities Sxf sent to individual controller 403 are converted there into quantities deltaPBrad2 and deltaMMot. Quantities deltaPBrad2 are sent to block 404 and quantities deltaMMot are sent to block 405, which represents the engine influencing means. It should be noted that the quantities shown in FIG. 4 deltaPBrad1 and deltaPBrad2 are combined in FIGS. 2 and 3 as quantities deltaPBwheel.

Block 404 performs the brake interventions as a function of quantities deltaPBrad2, deltaPBrad2, and admission pressure PB. Block 405 performs intervention on the propulsion system or, more accurately, engine interventions as a function of quantities deltaMMot supplied to it and engine torque MMot defined by the driver.

As mentioned previously, actuator system 202 may also contain a device for performing steering actions. Such device is not illustrated in FIG. 4; therefore quantity deltaz' is not supplied to actuator system 202.

FIG. 5 is explained in detail below.

Quantities Sxb detected by sensors 205b are sent to block 301 representing signal processing. Quantities Sxa detected by sensors 205a are sent to both block 301 and actuator system 202.

On the basis of quantities Sxa and Sxb supplied to it, block 301 generates different quantities and signals. These include vehicle motion quantity omegaactual describing the yaw rate of the traction vehicle, vehicle motion quantity betaactual describing the float angle of the traction vehicle, and vehicle motion quantity deltapsiactual describing the buckle angle. These three vehicle motion quantities are supplied to controller 303. In detail, vehicle motion quantity omegaactual is supplied to subtractor means 505, vehicle motion quantity betaactual is supplied to subtractor means 506, and vehicle motion quantity deltapsiactual is supplied to subtractor means 507. These three vehicle motion quantities correspond to the actual values required for control. In FIG. 3 they are contained in quantities Sxc2.

Two vehicle motion quantities omegaactual and deltapsiactual are obtained by filtering the respective quantities obtained using the yaw rate sensor and the buckle angle sensor. Vehicle motion quantity betaactual is determined, as mentioned before, by estimation.

Subsequently a velocity quantity vf describing the velocity of the vehicle, and a steering angle quantity deltaz describing the steering angle set for the traction vehicle are determined in block 301. Both quantities are supplied to controller 302, or more accurately to determination means 501, 502, and 503. Both velocity quantity vf and steering angle quantity deltaz are contained in quantities Sxcl shown in FIG. 3.

In addition, quantities Sxg are generated in block 301 and supplied to determination means 501, 502, and 503. Quantities Sxg are contained in quantities Sxcl shown in FIG. 3. The individual quantities contained in quantities Sxg will be explained in more detail below.

If the period of time after which the characteristic quantities attain their respective final values is not predefined, this period of time St is determined in block 301 as a function of the vehicle velocity or the vehicle mass, for example. Time period St thus determined is supplied to a block 504 to be described later. Quantity St is also contained in quantities Sxel shown in FIG. 3.

A final value omegasetpoint, for characteristic quantity omegasetpointd is determined in determination means 501 as a function of velocity quantity vf and steering angle quantity deltaz supplied to it. For this purpose a vehicle model is stored in determination means 501, for which velocity quantity vf and steering angle quantity deltaz represent the input quantities. Final value omegasetpoint$_s$ is supplied to block 504.

A final value betasetpoint$_s$ for characteristic quantity betasetpointd is similarly determined using determination means 502 as a function of velocity value vf and steering angle value deltaz with the help of a vehicle model, and a final value deltapsisetpoint$_s$ for characteristic value deltapsisetpointd, is determined using determination means 503 as a function of velocity quantity vf and steering angle quantity deltaz with the help of a vehicle model. Both final values are supplied to block 504.

Although these three determination means 501, 502, and 503 receive the same quantities as input quantities, these determination means contain different vehicle models.

As mentioned previously, quantities Sxg are supplied to determination means 501, 502, and 503. These quantities Sxg contain individual quantities such as, for example, the transverse acceleration or the longitudinal acceleration of the traction vehicle, a friction coefficient or the estimated wheel forces, based on which individual final values, primarily the final values for the yaw rate and the buckle angle, are limited to physically plausible values according to the prevailing conditions. For example, the final values for the yaw rate or for the buckle angle are limited, as a function of the transverse acceleration, to such values for which there is no danger of overturning. On the other hand, quantities Sxg contain vehicle quantities such as the two mass quantities describing the mass of the traction vehicle and the semi-trailer, or the two center-of-gravity position quantities describing the position of the center of gravity for the traction vehicle and the semi-trailer.

Determination means 501, 502, and 506 contain vehicle parameters describing geometry parameters or tire side rigidity quantities describing the rigidity of the tires used. Both the geometry parameters and the tire side rigidity parameters are determined in the foreground. Depending on the vehicle quantities supplied to the determination means and on the vehicle parameters, different parameters contained in the vehicle models are determined. The vehicle models are adjusted to the instantaneous load of the vehicle, for example, with this procedure. These vehicle model parameters include self-steering gradients, for example.

Instead of determining the vehicle model parameters as described above by estimating the quantities that determine these parameters, the parameters may also be determined directly using an appropriate estimation procedure.

Block 504 represents adjusting means with which the variation of characteristic quantities omegasetpointd, betasetpointd, and deltapsisetpointd over time is adjusted to the vehicle behavior. Using adjusting means 504 the characteristic quantities are determined as a function of the respective final values, i.e., characteristic quantity omegasetpointd is determined as a function of final value, omegasetpoints, characteristic quantity betasetpointd is determined as a function of final value betasetpoint$_s$, and characteristic quantity deltapsisetpointd is determined as a function of final value deltapsisetpoint$_s$. The variation over time of the characteristic quantities is adjusted to the vehicle behavior in adjusting means 504, so that the characteristic values attain their respective final values only after a predefined period of time that is characteristic for the vehicle. As indicated above, this period of time is either a fixed period of time or a period of time St is determined in block 301 at least as a function of the quantity describing the vehicle's behavior. Either the variations over time of all characteristic quantities are adjusted in the same manner to the vehicle behavior in adjusting means 504, or the variation over time of each individual characteristic quantity is separately adjusted to the vehicle's behavior. In the first case, the period of time is the same for all characteristic values; in the second case, the period of time is different for each characteristic value.

Adjusting means 504 are filtering means designed, in particular as low-pass filters or as all-pass filters. The variation over time of the characteristic values is influenced by defining a filter constant. The filter constant either corresponds to the predefined time period of or determined time period St, or it is determined as a function of these values.

Characteristic value omegasetpointd is supplied to subtractor means 505 from adjusting means 504. System deviation deltaomega for the yaw rate is determined as a function of characteristic quantity omegasetpointd and vehicle motion quantity omegaactual and supplied to the block 508. In a similar manner, characteristic quantity betasetpointd is supplied to subtractor means 506, and system deviation deltabeta is determined for the float angle as a function of betasetpointd and vehicle motion quantity betaactual and is also supplied to block 508. Characteristic quantity deltapsisetpointd is also sent to subtractor means 507, and system deviation deltadeltapsi for the buckle angle is determined as a function of deltapsisetpointd and vehicle motion quantity deltapsiactual and is also supplied to block 508.

Block 508 includes individual controller 401', not illustrated in FIG. 5, whose function corresponds to that of individual controller 401 in FIG. 4. However, subtractor means 505, 506, and 507 contained in individual controller 401 are dislocated in the case of individual controller 401' contained in block 508. Furthermore, block 508 includes individual controllers 402 and 403 illustrated in FIG. 4. Block 508 determines, as a function of the system deviations supplied to it, quantities deltaMMot and deltaPBwheel. These quantities are supplied to actuator system 202 to perform the required stabilization actions. For example, if understeering of the traction vehicle is detected, its rear wheel internal to the curve is braked; however, if oversteering of the traction vehicle is detected, its front wheel external to the curve is braked. In both cases a counter-yaw torque is obtained by braking individual wheels, which counteracts the understeering or the oversteering.

In summary, the device according to the present invention is a device with which the behavior of the vehicle is influenced so that the stability and controllability of the vehicle in critical situations is guaranteed according to the experience of the driver. Situations critical from the point of view of longitudinal dynamics are alleviated using the conventional drive slip control systems and/or brake slip control systems and stabilizing lateral forces are maintained. This maintains steerability and increases traction. In addition, the driver is supported by a vehicle dynamics system in any transverse dynamically critical situation, and the vehicle is stabilized in all driving situations. In particular, in the case of semitrailers, driving behavior is improved when changing lanes, cornering, or changing load. In addition, rollover or buckling of the tractor-trailer is avoided.

On the basis of the conventional vehicle dynamics system for passenger vehicles, it is to be noted with regard to utility vehicles that the position of the center of gravity, the mass, and the geometry are highly dependent on load and on the type of the towed vehicle.

It should be noted again that the device according to the present convention can be used either for a tractor-trailer or for a single vehicle. In the case of a tractor-trailer, the yaw rate and the float angle of the tractor vehicle and the buckle angle are controlled. In the case of a single vehicle, the yaw rate and the float angle are controlled.

Finally it should be noted that the form of the embodiments selected in the description has no limiting effect on the idea to the present invention.

What is claimed is:

1. A device for stabilizing a vehicle, comprising:
    a first determining device determining at least two vehicle motion quantities, the at least two vehicle motion quantities describing a motion of the vehicle;
    a second determining device including an adjustment device, the second determining device determining a characteristic quantity for each of the at least two vehicle motion quantities, the adjustment device adjusting a variation over time of the characteristic quantities to a behavior of the vehicle; and
    a control device determining intervention quantities at least as a function of the at least two vehicle motion quantities and the characteristic quantities for performing at least one of brake interventions and engine interventions, the vehicle being stabilized via the at least one of the brake interventions and engine interventions.

2. The device according to claim 1, wherein:
    the at least two vehicle motion quantities describe the motion of the vehicle in a direction transverse to the vehicle.

3. The device according to claim 1, wherein:
    the second determination device includes a calculation device determining a final value for each of the characteristic quantities, the final values being supplied to the adjustment device, the characteristic quantities being determined as a function of the final values.

4. The device according to claim 3 wherein:
    the final values are determined at least as a function of a steering angle quantity and a velocity quantity, the final values corresponding to values of the at least two motion quantities prevailing in a steady-state condition of the vehicle, the steering angle quantity describing a steering angle set for the vehicle, the velocity quantity describing a velocity of the vehicle.

5. The device according to claim 4, wherein:
    the final values are determined using vehicle models, at least some parameters used in the vehicle models being determined at least as a function of at least one of vehicle quantities and vehicle parameters.

6. The device according to claim 5, wherein:
    at least one of:
        the vehicle quantities include at least one of at least one mass quantity and at least center-of-gravity position quantity; and
        the vehicle parameters include at least one of geometry parameters and tire-side rigidity quantities.

7. The device according to claim 3, wherein:
    the variation over time of the characteristic quantities is adjusted to the behavior of the vehicle via the adjustment device so that each of the characteristic quantities attains its respective final value only after a time period, the time period being characteristic for the vehicle.

8. The device according to claim 7, wherein:
    the time period is one of predefined and determined at least as a function of a quantity describing the behavior of the vehicle.

9. The device according to claim 7, wherein the variation over time is one of:
    all of the characteristic quantities is adjusted in a same manner to the behavior of the vehicle, the time period for all of the characteristic quantities being equal; and
    each characteristic quantity is adjusted separately to the behavior of the vehicle, the time period for each characteristic quantity being different.

10. The device according to claim 3, wherein:
    at least some of the final values are limited.

11. The device according to claim 10 wherein:
    the at least some of the final values are limited as a function of one of:
        at least one of a transverse acceleration quantity and a longitudinal acceleration quantity, the transverse acceleration quantity describing a transverse acceleration acting on the vehicle, the longitudinal acceleration quantity describing a longitudinal acceleration acting on the vehicle;
        a friction coefficient quantity; and
        wheel force quantities describing forces acting on the wheels of the vehicle.

12. The device according to claims 1, wherein the variation over time is one of:
    all of the characteristic quantities is adjusted in a same manner to the behavior of the vehicle; and
    each characteristic quantity is adjusted separately to the behavior of the vehicle.

13. The device according to claim 1, wherein:
    the adjustment device includes a filtering device, the filtering device including one of low-pass filters and all-pass filters, the variation over time of the characteristic quantities being influence by defining a filter constant.

14. The device according to claim 1, wherein:
    the control device includes different individual controllers, at least one of the different individual controllers influencing the other different individual controllers and controlling the other different individual controllers.

15. The device according to claim 1, wherein:
    the vehicle is a tractor-trailer, the tractor-trailer including a tractor vehicle and one of a trailer and a semi-trailer;
    the at least two motion quantities includes three vehicle motion quantities determined using the first determination device, two of the three vehicle motion quantities describing a behavior of the tractor vehicle, the remaining one of the three vehicle motion quantities describing with respect to the tractor vehicle one of: a position of the one of the trailer and the semi-trailer and a behavior of the one of the trailer and the semi-trailer.

16. The device according to claim 15, wherein:
    at least one of:
        a yaw rate quantity is determined as a first vehicle motion quantity, the yaw rate quantity describing a yaw rate of the tractor vehicle;

a float angle quantity is determined as a second vehicle motion quantity, the float angle quantity describing a float angle of the tractor-trailer; and a buckle angle quantity is determined as a third vehicle motion quantity, the buckle angle quantity describing a buckle angle between the tractor vehicle and the one of the trailer and the semi-trailer.

17. A method of stabilizing a vehicle, comprising the steps of:

determining at least two vehicle motion quantities describing a motion of the vehicle;

determining a characteristic quantity for each of the at least two vehicle motion quantities;

adjusting a variation over time of the characteristic quantities to a behavior of the vehicle;

determining intervention quantities at least as a function of the at least two vehicle motion quantities; and performing at least one of brake interventions and engine interventions as a function of the intervention quantities to stabilize the vehicle.

18. The method according to claim 17, wherein:

the motion of the vehicle is in a transverse direction of the vehicle.

* * * * *

UNITED STATES PATENT AND TRADEMARK OFFICE
CERTIFICATE OF CORRECTION

PATENT NO.   : 6,604,035 B1
DATED        : August 5, 2003
INVENTOR(S)  : Wetzel et al.

It is certified that error appears in the above-identified patent and that said Letters Patent is hereby corrected as shown below:

Column 4,
Line 34, change "wheeler belong to" to -- wheels belong to --

Column 5,
Line 28, change "systems" to -- system --
Line 38, change "includes" to -- include --

Column 7,
Line 1, change "convention" to -- conventional --
Line 12, change "quantity" to -- quantity, --

Column 12,
Line 33, change "claims 1," to -- claim 1, --

Signed and Sealed this

Seventh Day of September, 2004

JON W. DUDAS
*Director of the United States Patent and Trademark Office*